No. 654,999. Patented July 31, 1900.
W. S. MOODY.
ELECTRIC MOTOR.
(Application filed May 7, 1898.)
(No Model.) 2 Sheets—Sheet 1.
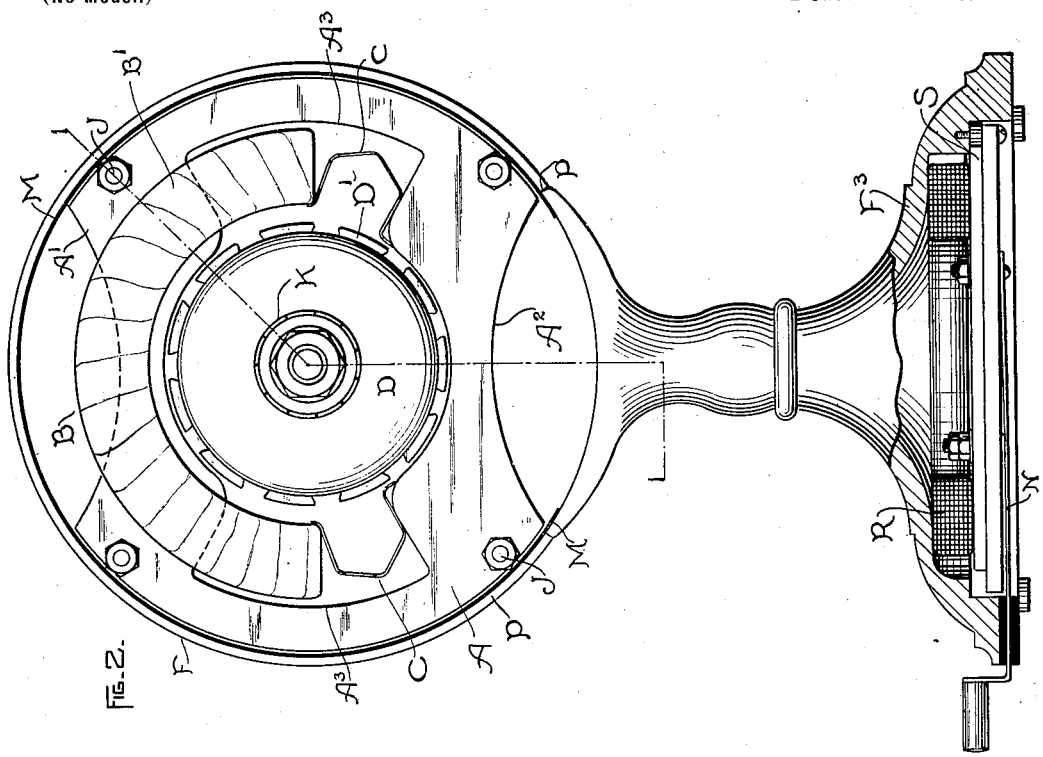
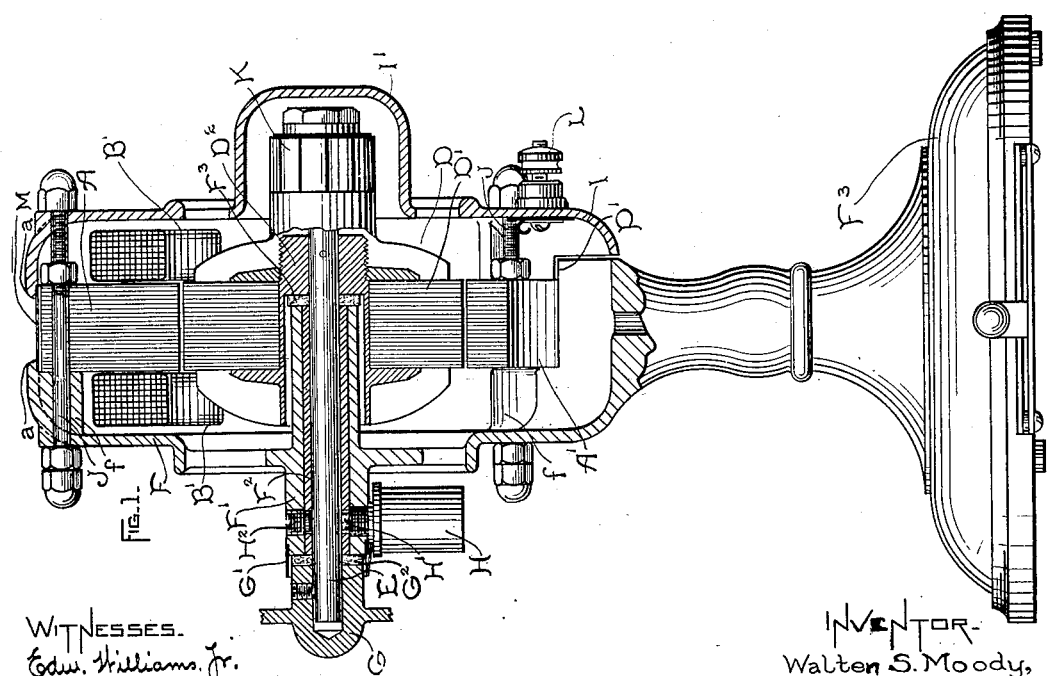
Witnesses.
Edw. Williams Jr.
A. F. Macdonald.
Inventor.
Walter S. Moody,
by Albert G. Davis
Atty.

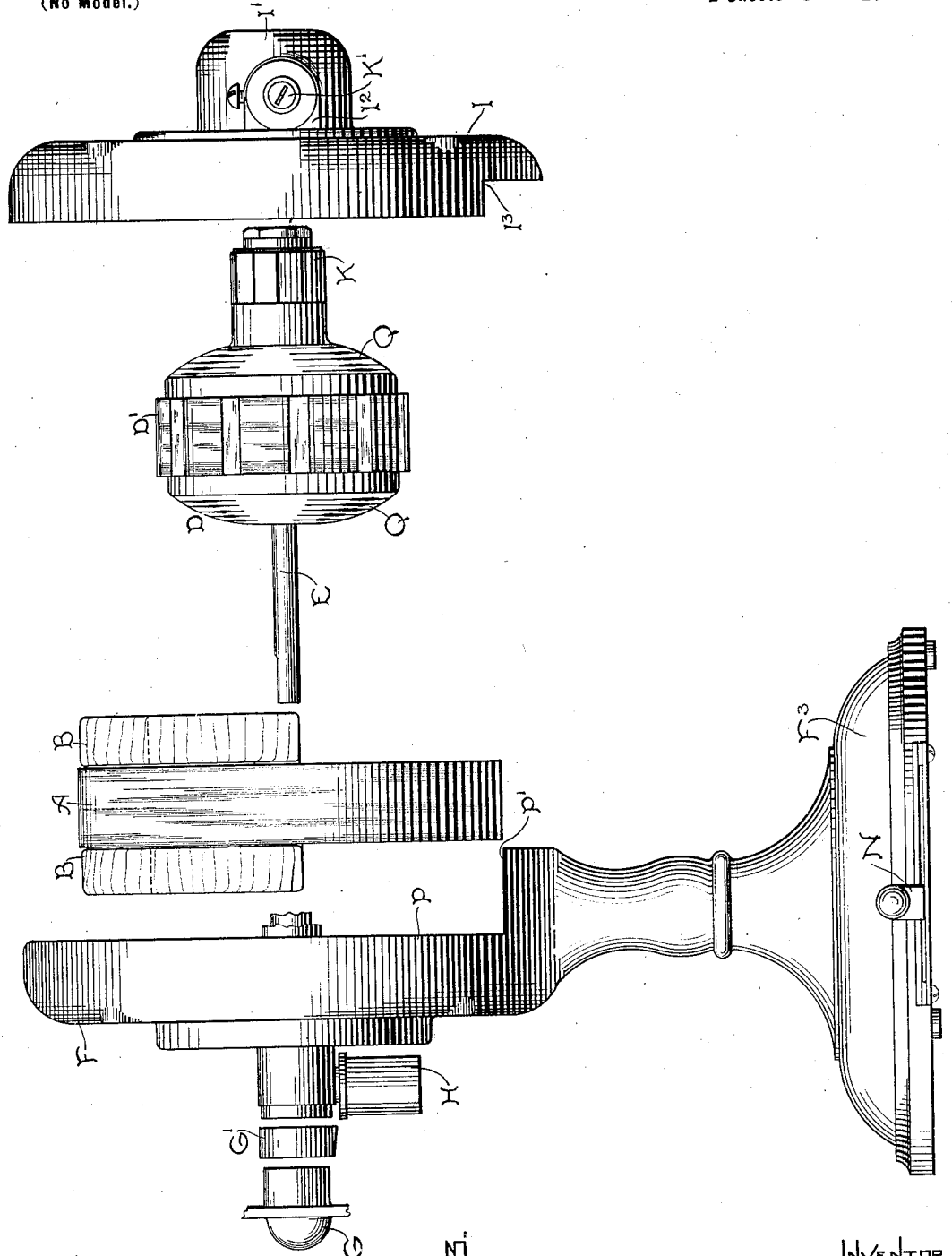

UNITED STATES PATENT OFFICE.

WALTER S. MOODY, OF SCHENECTADY, NEW YORK, ASSIGNOR TO THE GENERAL ELECTRIC COMPANY, OF NEW YORK.

ELECTRIC MOTOR.

SPECIFICATION forming part of Letters Patent No. 654,999, dated July 31, 1900.

Application filed May 7, 1898. Serial No. 679,980. (No model.)

*To all whom it may concern:*

Be it known that I, WALTER S. MOODY, a citizen of the United States, residing at Schenectady, in the county of Schenectady, State of New York, have invented certain new and useful Improvements in Electric Motors, (Case No. 835,) of which the following is a specification.

My invention relates to small electric motors, and more particularly to those designed for use in connection with ventilating-fans.

My invention has for its object to simplify and improve the construction of the motor and at the same time to improve its general appearance.

In the accompanying drawings, which show an embodiment of my invention, Figure 1 is a section taken on the line 1 1 of Fig. 2. Fig. 2 is an end elevation with a part of the casing removed; and Fig. 3 is a view of the motor with the various parts separated therefrom.

The invention is shown in connection with a direct-current motor, but certain of the features are also applicable to alternating-current motors.

The motor shown is provided with a laminated field-magnet structure A, which is provided with an upper wound pole and an unwound or distributive lower pole. The field-magnet is substantially circular, and is cut away at $A'$ and $A^2$ for the purpose of saving stock. The inner periphery of the magnet is recessed at $A^3$ to receive the two parallel sides of the field-coil B, which are connected by semicircular end portions $B'$, extending around the entire upper half of the armature. The field-coil is retained in place by means of two flat spring-clips C, which are compressed as they are inserted between the coil and the core and then permitted to spring outward and sustain the coil. By employing a single field-coil and locating it above the armature the upward pull due to the magnetizing power of the coil will reduce the friction on the bearings, thereby increasing the efficiency of the motor.

The armature D is provided with a laminated core $D'$, and the winding thereon may be of any desired construction. I have found the well-known Eickemeyer winding to be very satisfactory. The core is supported by a hub $D^2$, which is mounted on the shaft E at one end, and is bored out to receive the bearing $F'$ at the other. The bearing $F'$ is formed integral with the frame or casing F and extends inward under the laminated body of the armature and outward to form a support for the fan G or other device driven by the motor. Between the bearing and the shaft is a bearing-sleeve $F^2$, and at the end of the bearing is a leather washer $F^3$ to take up end play. With the arrangement shown only a single bearing is necessary, which materially decreases the amount of machine work, and hence the cost, and at the same time simplifies the construction.

Screw-threaded to the under side of the bearing is an oil-cup H, containing a wick $H'$, which lubricates the shaft by bearing on its under side. Situated above the wick on the top side of the shaft is a screw-threaded plug $H^2$, which may be removed for the purpose of refilling the oil-cup. A motor of this kind when properly taken care of will run the entire season on one cupful of oil. Between the end of the bearing and the hub of the fan is a leather or felt washer $G^2$, and as the oil works outward from the bearing it is caught by the washer and drips down on the lower part of the circumferential ring $G'$, which conveys it back to the oil-cup, the latter being provided with a perforated cover.

The supporting frame or casing for the motor is made of two castings F and I, the line of division being in a vertical plane. The casting F forms the major portion of the casing and is provided with an enlarged base $F^3$. The upper part of this casing is circular and is adapted to receive and hold the laminated field-magnet structure. Situated in back of the laminated field-magnet are supporting-lugs $f$, and extending through the lugs and also the laminations are clamping-bolts J. The removable casting I is cup-shaped and surrounds the end of the armature and is provided with a circular projection $I'$, which surrounds the commutator K and protects it from dirt and injury. Mounted in lugs I², formed on the projection I', are brushes K', which make contact with the moving commutator. The casting I is secured in place by means of the clamping-bolts J, and is so arranged that it may be removed without disturbing the laminated field-magnet. On the front of the casting are suitable binding-posts L, which are connected to the circuit of the motor and also to the resistance R, mounted in the base F³.

The castings F and I are both provided with circumferentially-extending lips or extensions $a$, which inclose the outer laminæ and retain the nickel-plated metal band M in place. The metal band serves to protect the edges of the laminæ from dust and dirt and at the same time adds to the general appearance of the motor.

The controlling-resistance R, which is wound into a flat coil and suitably insulated, is mounted on top of a porcelain or other heat-resisting support S and the whole secured by screws to the under side of the enlarged base F³. The upper surface of the coil rests on a shoulder formed on the under side of the base. By this arrangement the heat generated in the coil is readily absorbed.

In circuit with the resistance and mounted on the under side of the support S is a controlling-switch N, which is arranged to cut the resistance into and out of circuit.

Referring to Fig. 3, the various parts of the motor are shown separated from each other. The portion of the casting F is cut away at P to receive the laminations, and the cup-shaped portion I of the casing is notched at I³ on the lower left-hand corner, where it fits over the projection P' of the main portion of the casing. The armature is provided with suitable coverings Q to protect the armature-coils from dirt.

What I claim as new, and desire to secure by Letters Patent of the United States, is—

1. In an electric motor, the combination of a field-magnet having one wound and one unwound pole, an armature revolving within the field-magnet, and an energizing-coil for the field-magnet which surrounds the entire upper half of the armature.

2. In an electric motor, the combination of a field-magnet, a coil for energizing the field-magnet, and a spring-clip for securing the coil in place.

3. In an electric motor, the combination of a circular field-magnet which is cut away top and bottom and is provided with one wound and one unwound pole, recesses in the inner periphery of the magnet arranged to receive the coil, an energizing-coil mounted within the recess, which surrounds the entire upper half of the armature, and an armature mounted for movement within the field-magnet.

4. In an electric motor, the combination of a field-magnet, a casing for surrounding and supporting the field-magnet, which is divided into two parts in a vertical plane, and a metal band which is located between the parts of the casing for protecting the field-magnet from dirt and giving the motor a smooth external appearance.

5. In an electric motor, the combination of a field-magnet, a casing for surrounding and supporting the field-magnet, which is divided into two parts in a vertical plane, one of said parts being provided with the base or standard, the other part acting as a cover to inclose one end of the motor, means for securing the field-magnet between the parts of the casing, a metal band surrounding the field-magnet, and lips or projections on the parts of the casing for retaining the band in place.

6. In an electric motor, the combination of a field-magnet and laminated armature, a two-part casing surrounding the field and armature, which forms no part of the magnetic circuit, bolts for clamping the field-magnet to one portion of the casing, at the same time providing a support for the removable portion of the casing, and a cup-shaped removable casing which surrounds the commutator and forms an end for the motor.

7. In an electric fan-motor, the combination of an armature, a casing which surrounds and supports the armature, a single bearing for the armature and fan, means for taking up end play on the armature-shaft, an oil-cup secured to the bearing and provided with a wick which bears on the armature-shaft, and a circumferential ring for catching the oil as it works outward from the bearing and returning it to the oil-cup.

8. In an electric motor, the combination of a hollow metal supporting-base, a regulating-resistance mounted in the base in direct contact therewith so that the heat will be absorbed by the base, and a body of heat-resisting material secured to the base and forming a support for the resistance.

9. In an electric motor, the combination of a hollow metal supporting-base, a regulating-resistance mounted in the base in direct contact therewith so that the heat will be absorbed by the base, a body of heat-resisting material forming a support for the resistance which is secured to the base, and a switch mounted on the under side of the heat-resisting support, for cutting the resistance into and out of circuit.

10. In an electric fan-motor, the combination of an enlarged supporting-base, a flat porcelain or other heat-resisting support mounted horizontally within the base, a regulating-resistance lying on the top side of the porcelain base in heat-conductive relation to the base, and bearing against the same, and a regulating-switch which extends outside of the supporting-base mounted on the under side of the porcelain base.

11. An electric motor comprising a two-part casting completely housing the field-magnet and armature, one casting having a stand or support integral therewith.

12. An electric motor having a two-part casting including the field-magnet and armature, one casting including a stand or support, a chamber in the other casting to house the commutator, and brushes supported on the walls of said chamber.

In witness whereof I have hereunto set my hand this 5th day of May, 1898.

WALTER S. MOODY.

Witnesses:
B. B. HULL,
M. H. EMERSON.